(12) United States Patent
Lombardo

(10) Patent No.: US 10,844,587 B2
(45) Date of Patent: Nov. 24, 2020

(54) SYSTEM FOR STORMWATER DISCHARGE

(71) Applicant: Christopher Lombardo, Houston, TX (US)

(72) Inventor: Christopher Lombardo, Houston, TX (US)

(*) Notice: Subject to any disclaimer, the term of this patent is extended or adjusted under 35 U.S.C. 154(b) by 0 days.

(21) Appl. No.: 16/137,280

(22) Filed: Sep. 20, 2018

(65) Prior Publication Data
US 2019/0093334 A1    Mar. 28, 2019

Related U.S. Application Data

(60) Provisional application No. 62/563,503, filed on Sep. 26, 2017.

(51) Int. Cl.
*E03F 3/04*    (2006.01)
*E03F 1/00*    (2006.01)
*F16L 3/00*    (2006.01)

(52) U.S. Cl.
CPC .............. *E03F 1/00* (2013.01); *E03F 3/04* (2013.01); *F16L 3/00* (2013.01)

(58) Field of Classification Search
CPC .................................. F16L 55/00; E03F 3/04
USPC ................ 138/106, 107; 248/49; 285/179
See application file for complete search history.

(56) References Cited

U.S. PATENT DOCUMENTS

| | | | | |
|---|---|---|---|---|
| 3,838,712 A * | 10/1974 | Courtney | ................ | F16L 3/00 138/103 |
| 4,445,255 A * | 5/1984 | Olejak | .................... | E21B 17/01 24/284 |
| 4,445,656 A * | 5/1984 | Leitch | .................. | F16L 3/1058 24/23 R |
| 5,906,341 A * | 5/1999 | Brown | ..................... | F16L 3/227 248/49 |
| 6,076,778 A * | 6/2000 | Brown | ..................... | F16L 3/227 248/49 |
| 6,148,864 A * | 11/2000 | Pascoe | .................... | F16L 1/028 138/107 |
| 8,245,733 B2 * | 8/2012 | Renaud | .................... | F16L 3/06 138/106 |
| 8,444,188 B2 * | 5/2013 | Pucciani | ............... | F16L 21/002 285/148.18 |
| 2010/0117356 A1 * | 5/2010 | Pucciani | ............... | F16L 21/002 285/238 |
| 2010/0133804 A1 * | 6/2010 | Larkin | .................. | F16L 21/002 285/16 |

* cited by examiner

*Primary Examiner* — Patrick F Brinson
(74) *Attorney, Agent, or Firm* — Tumey L.L.P.

(57) ABSTRACT

The disclosure is directed to a discharge system for usage in fluid transportation. Further, embodiments relate to a discharge system comprising a plurality of discharge apparatuses that may remove a fluid from one area and transport it to another area. A discharge system may comprise a first discharge apparatus, wherein the first discharge apparatus comprises a tubular, wherein the tubular comprises a plurality of sections, a central bore, a first opening, and a second opening; and a second discharge apparatus, wherein the second discharge apparatus comprises the tubular.

3 Claims, 2 Drawing Sheets

SYSTEM FOR STORMWATER DISCHARGE

CROSS-REFERENCE TO RELATED APPLICATIONS

The present application claims priority to Provisional Application No. 62/563,503 filed on Sep. 26, 2017, entitled "System for Stormwater Discharge," the disclosure of which is incorporated herein by reference.

BACKGROUND

Embodiments relate generally to tubular equipment that may promote fluid flow. More particularly, embodiments relate to a system that may transport the fluid in existing drainage systems that are oversaturated.

To reduce the amount of fluid in a specified area that may flow into a drainage system, operators may employ tubular apparatuses in order to reduce the amount of fluid within the existing drainage systems, thereby allowing more fluid to flow through. Areas that are oversaturated with fluids are at the risk of flooding and damage to structures. Currently, these apparatuses may be inserted into designated areas to allow a reduction in fluid height level. Thus, a new apparatus may prevent physical damage and the replacement cost of structures affected by a fluid. By employing this device, the operator may be able to allow fluid to flow out of an existing drainage system, thereby allowing further drainage to occur.

BRIEF DESCRIPTION OF THE DRAWINGS

These drawings illustrate certain aspects of some of the embodiments of the present invention and should not be used to limit or define the invention.

DETAILED DESCRIPTION

Embodiments relate generally to a discharge apparatus for usage in fluid transportation. More principally, embodiments relate to a discharge system comprising a plurality of discharge apparatuses that may remove the fluid from one area and transport it to another area. In embodiments, the discharge apparatus may be constructed with multiple parts and connections and may be employed with existing drainage systems.

Figure 1A:
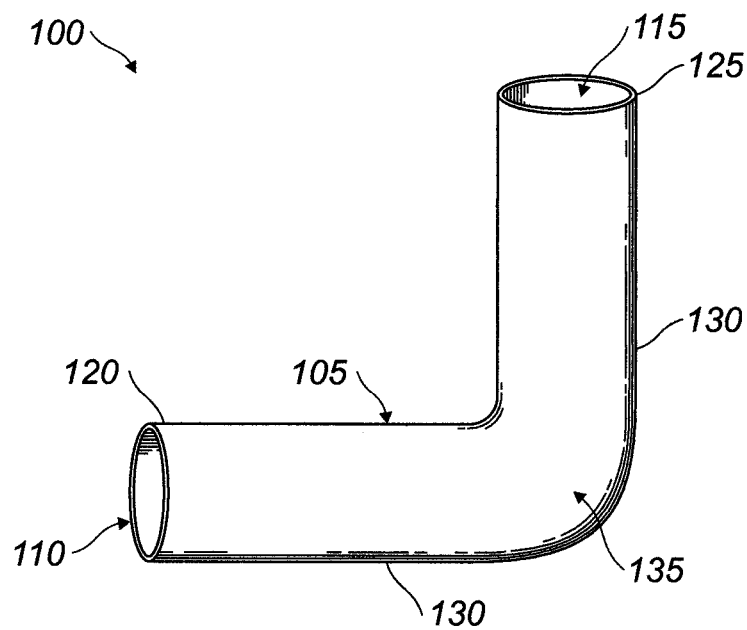
FIG. 1A illustrates an embodiment of a first discharge apparatus.
Figure 1B:
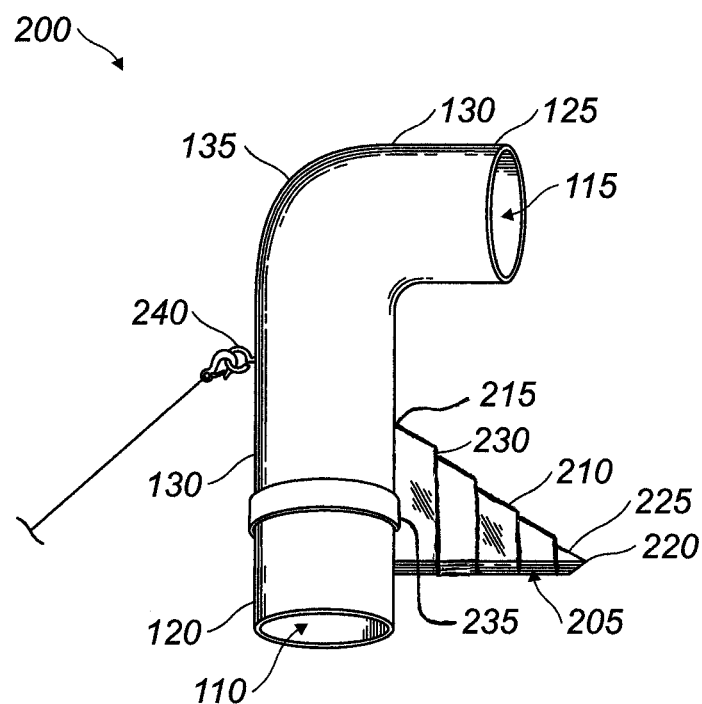
FIG. 1B illustrates an embodiment of a second discharge apparatus.

FIGS. 1A and 1B illustrate embodiments of a first discharge apparatus 100 and a second discharge apparatus 200. First discharge apparatus 100 and second discharge apparatus 200 may allow a designated passage for a fluid to flow. First discharge apparatus 100 and/or second discharge apparatus 200 may comprise of a tubular 105.

In embodiments, there may be a plurality of tubulars 105 in first discharge apparatus 100 and/or second discharge apparatus 200. Without limitation, the plurality of tubulars 105 may allow first discharge apparatus 100 and/or second discharge apparatus 200 to form various configurations. Tubular 105 may serve as the passage for a fluid to flow. Tubular 105 may be any suitable size, height, or shape. Without limitation, a suitable shape may include, but is not limited to, cross-sectional shapes that are circular, elliptical, triangular, rectangular, square, hexagonal, and/or combinations thereof. In embodiments, tubular 105 may have a circular cross-section. Tubular 105 may have an outer diameter and an inner diameter. In embodiments, the outer diameter and the inner diameter may have the same or different dimensions. Without limitations, the outer diameter and/or the inner diameter may have a dimension between from about 0.5 inches to about 4 inches. In certain embodiments, the outer diameter may be about 3.5 inches, and the inner diameter may be about 3 inches. Without limitations, the length of tubular 105 may be from about 5 inches to about 35 inches. Tubular 105 may be made from any suitable material. Suitable material may include, but is not limited to, metals, nonmetals, polymers, ceramics, and/or combinations thereof. Without limitations, tubular 105 may comprise of a non-corrosive plastic, such as polyvinyl chloride (PVC), high-density polyethylene (HDPE), and/or the like.

In embodiments, tubular 105 may comprise of a first opening 110 and a second opening 115. First opening 110 may be disposed about a first end 120 of tubular 105. Second opening 115 may be disposed about a second end 125, wherein second end 125 is opposite from first opening 110. First opening 110 and second opening 115 may be an absence of material. First opening 110 and second opening 115 may be used interchangeably. First opening 110 and second opening 115 may be any suitable size and shape. In embodiments, first opening 110 and second opening 115 may have circular cross-sections. Without limitations, first opening 110 may have a smaller, larger, or the same sized cross-sectional shape as second opening 115. First opening 110 may allow the entrance of fluid into tubular 105, and second opening 115 may allow the exit of fluid from tubular 105 (or vice versa). Tubular 105 may further comprise a central bore that runs the length of tubular 105, thereby connecting first opening 110 to second opening 115. In some embodiments, tubular 105 may be straight, curved, bent and/or combinations thereof. Tubular 105 may be a single piece or may comprise of a plurality of sections 130.

In embodiments, the plurality of sections 130 may have the same dimensions, different dimensions, and/or combinations thereof. The plurality of sections 130 may be disposed perpendicularly or parallel about each other. Alternatively, the plurality of sections 130 may be disposed at any suitable angle with each other. The plurality of sections 130 may be temporarily or permanently disposed by any suitable means. In embodiments, the suitable means may include, but are not limited to, the use of suitable fasteners, threading, adhesives, welding and/or any combination thereof. Without limitation, suitable fasteners may include nuts and bolts, washers, screws, pins, sockets, rods and studs, hinges, and/or any combination thereof.

In embodiments, one of the plurality of sections 130 may be disposed about another separate one of the plurality of sections 130 to form an elbow 135. Alternatively, an elbow 135 connector may be used to couple one of the plurality of sections 130 to the separate one of the plurality of sections 130. As elbow 135 is formed, the central bores of each of the plurality of sections 130 may be partially or fully aligned. By default, elbow 135 may join the plurality of sections 130 together in a perpendicular fashion. In alternative embodiments, elbow 135 may be designed to affix the plurality of section 130 at any suitable angle. Without limitations, elbow 135 may be set at an angle in a range of between about 20 degrees to about 70 degrees, from about 70 degrees to about 130 degrees, or from about 130 degrees to about 180 degrees. In certain embodiments, elbow 135 may have an angle of about 90 degrees.

In embodiments, first discharge apparatus 100 may be disposed about second discharge apparatus 200. An end of first discharge apparatus 100 may be temporarily or permanently disposed about an end of second discharge apparatus 200 by any suitable means. In embodiments, the suitable means may include, but are not limited to, the use of suitable fasteners, threading, adhesives, welding and/or any combination thereof. Without limitation, suitable fasteners may include nuts and bolts, washers, screws, pins, sockets, rods and studs, hinges, and/or any combination thereof. In embodiments, second opening 115 of first discharge apparatus 100 may be aligned with first opening 110 of second discharge apparatus 200 to allow fluid to flow through both first discharge apparatus 100 and second discharge apparatus 200. In certain embodiments, the connection between first discharge apparatus 100 and second discharge apparatus 200 may account for a change in dimensions. First discharge apparatus 100 may have a larger or smaller outer diameter than second discharge apparatus 200. Alternatively, first discharge apparatus 100 may have a larger or smaller inner diameter than second discharge apparatus 200. In embodiments, first opening of first discharge apparatus 100 may lie in the same Cartesian plane as second opening 115 of second discharge apparatus 200. In certain embodiments, first opening 110 of first discharge apparatus 100 may be offset from second opening 115 of second discharge apparatus 200 by a pre-defined angle so as to enable potential fluid flow to occur in three-dimensional space. Without limitations, the pre-defined angle may be in a range of from about 5 degrees to about 90 degrees.

As illustrated in FIG. 1B, a stand 205 may be disposed about second discharge apparatus 200. Stand 205 may be detachable or may be permanently disposed about a location on second discharge apparatus 200. Stand 205 may serve to stabilize second discharge apparatus 200. Stand 205 may be any suitable size, height, or shape. In embodiments, stand 205 may be triangular. Without limitation, stand 205 may comprise any suitable material. Suitable material may include, but is not limited to, metals, nonmetals, polymers, ceramics, and/or combinations thereof. Stand 205 may comprise a leg 210 and an attachment point 215.

Leg 210 may serve to support second discharge apparatus 200. There may be a plurality of legs 210. Leg 210 may be any suitable size, height, or shape. In certain embodiments, leg 210 may be telescoping. In those embodiments wherein leg 210 is telescoping, leg 210 may be mechanically, pneumatically, electrically, and/or hydraulically actuated to extend and/or retract. Without limitation, leg 210 may comprise any suitable material. Suitable material may include, but is not limited to, metals, nonmetals, polymers, ceramics, and/or combinations thereof. In embodiments, leg 210 may comprise a foot 220. Foot 220 may be connected to a first end 225 of leg 210. Foot 220 may serve to provide a stable resting position for leg 210. In embodiments, foot 220 may be disposed about an external surface. Without limitations, the external surface may be the ground and/or nearby structures. Foot 220 may be disposed at any suitable angle in relation to the external surface. In embodiments, a second end 230 of leg 210 may be disposed about attachment point 215.

Attachment point 215 may be a location where stand 205 attaches to second discharge apparatus 200. There may be a plurality of attachment points 215. Attachment point 215 may be any designated size, height, or shape. Without limitation, attachment point 215 may comprise any suitable material. Suitable material may include, but is not limited to, metals, nonmetals, polymers, ceramics, and/or combinations thereof. In embodiments, leg 210 may be riveted to second discharge apparatus 200 at attachment point 215. As leg 210 is coupled to second discharge apparatus 200 at attachment point 215, leg 210 may be free to rotate about attachment point 215. In embodiments, there may be a securing device 235 disposed on second discharge apparatus 200. Securing device 235 may be disposed at any suitable location on second discharge apparatus 200 in proximity to leg 210. Securing device 235 may be any suitable device capable of preventing movement of leg 210. Without limitations, securing device 235 may be a magnet, clip, strap, and/or combinations thereof.

With additional reference to FIG. 1B, there may be a linkage 240 disposed about second discharge apparatus 200. Linkage 240 may have a hollow portion that allows material to pass through it. In embodiments, the material, such as a rope, cord, strap, or the like, may be disposed through linkage 240 and secured to an external surface for additional support. Without limitations, linkage 240 may be an eyelet, D-ring, snap hook, flat hook, and/or combinations thereof.

Figure 2:
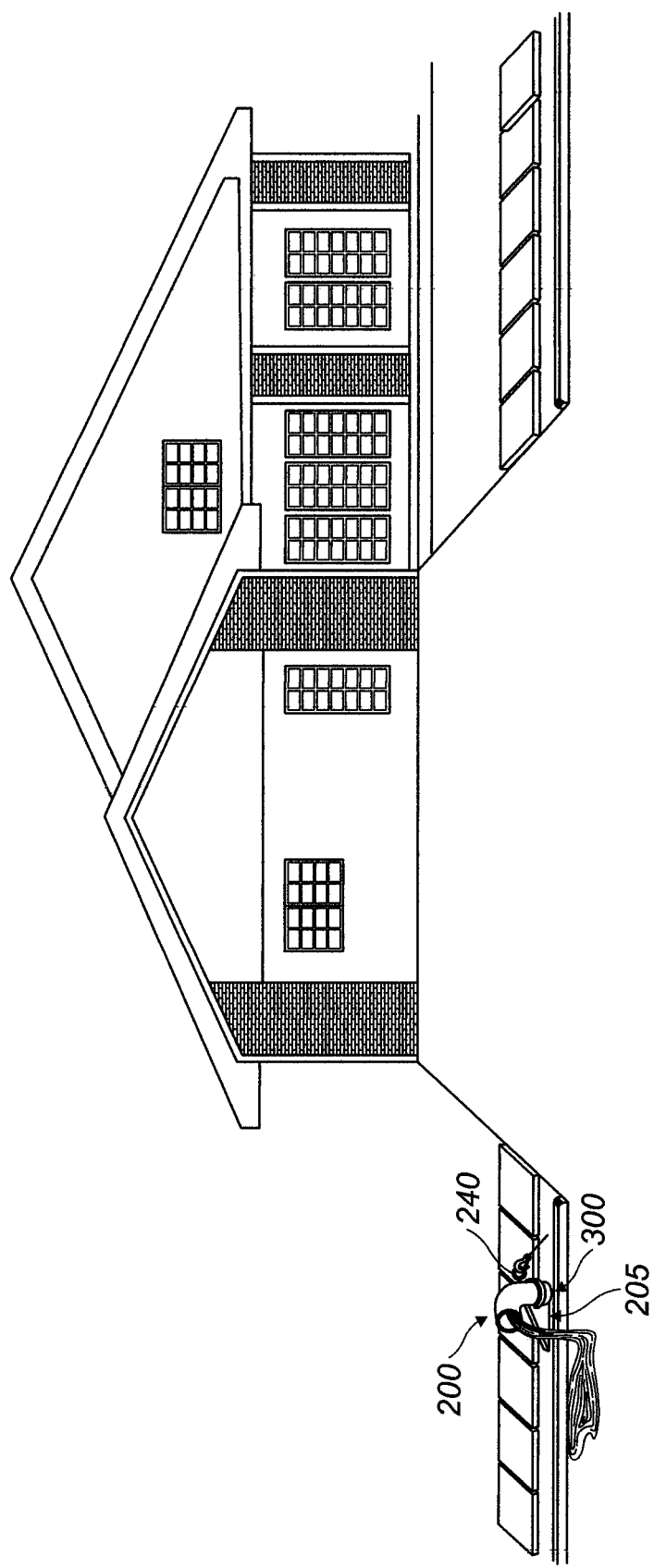
FIG. 2 illustrates an embodiment of operating a discharge apparatus.

FIG. 2 illustrates an embodiment of operating first discharge apparatus 100 (not illustrated) and second discharge apparatus 200 with an existing drainage system 300. Existing drainage system 300 may be any network of tubulars that has been constructed. In embodiments, existing drainage system 300 may be disposed underground. There may be an opening for access to existing drainage system 300 located on the surface of the ground.

In embodiments, an operator may dispose first discharge apparatus 100 into existing drainage system 300 to reduce the amount of fluid from existing drainage system 300. In embodiments, the tubulars within existing drainage system 300 may be full when the surrounding area is oversaturated with water. An operator may insert first discharge apparatus 100 into the opening of existing drainage system 300. First discharge apparatus 100 may be partially inserted or fully inserted into existing drainage system 300. Inserting first discharge apparatus 100 may allow water to flow out of existing drainage system 300 into first discharge apparatus. In embodiments, there may be a gasket (not illustrated) used to seal first discharge apparatus 100 with the opening of existing drainage system 300 so as to prevent leakage of any fluid being transported.

As previously discussed, second discharge apparatus 200 may be disposed about an end of first discharge apparatus 100. In embodiments, second opening 115 (referring to FIGS. 1A and 1B) of first discharge apparatus 100 may be aligned with first opening 210 (referring to FIGS. 1A and 1B) of second discharge apparatus 200 to allow fluid to flow through both first discharge apparatus 100 and second discharge apparatus 200. The water flowing into first drainage apparatus 100 may flow into and out of second discharge apparatus 200. Second discharge apparatus 200 may be partially or fully exposed from existing drainage system 300. In embodiments, the height of second discharge apparatus 200 may be adjustable. In embodiments, second opening 115 of second discharge apparatus 200 may be directed to project the water towards a designated area. Stand 205 and/or linkage 240 may be implemented to stabilize second discharge apparatus 200.

The foregoing figures and discussion are not intended to include all features of the present techniques to accommodate a buyer or seller, or to describe the system, nor is such figures and discussion limiting but exemplary and in the spirit of the present techniques.

What is claimed is:

1. A discharge system comprising:
a first discharge apparatus, wherein the first discharge apparatus comprises a tubular, wherein the tubular comprises a plurality of sections, a central bore, a first opening, and a second opening;
a second discharge apparatus, wherein the second discharge apparatus comprises a second tubular; and
a stand, wherein the stand is disposed on the second discharge apparatus, wherein the stand comprises a leg and an attachment point, wherein the leg comprises a foot, and wherein the length of the leg is telescoping.

2. A discharge system comprising:
a first discharge apparatus, wherein the first discharge apparatus comprises a tubular, wherein the tubular comprises a plurality of sections, a central bore, a first opening, and a second opening;
a second discharge apparatus, wherein the second discharge apparatus comprises a second tubular;
a stand, wherein the stand is disposed on the second discharge apparatus, wherein the stand comprises a leg and an attachment point, wherein the leg comprises a foot; and
a securing device, wherein the securing device is disposed on the second discharge apparatus, wherein the securing device prevents the movement of the leg, and wherein the securing device is a clip, magnet, or strap.

3. A method of operating a discharge system, comprising:
means for coupling a first discharge apparatus to a second discharge apparatus, wherein the first discharge apparatus and the second discharge apparatus comprise tubulars, wherein each tubular comprises a plurality of sections, a central bore, a first opening, and a second opening;
inserting the first discharge apparatus into an opening of an existing drainage system; and
securing the discharge system, wherein securing the discharge system further comprises of connecting a stand to the second discharge apparatus at an attachment point, wherein the stand comprises a leg, wherein the leg is telescopic, wherein the length of the leg is actuated to extend and retract, wherein the leg comprises a foot.

* * * * *